(12) United States Patent
Nakada et al.

(10) Patent No.: US 11,808,423 B2
(45) Date of Patent: Nov. 7, 2023

(54) VEHICULAR LAMP (71) Applicant: KOITO MANUFACTURING CO., LTD., Tokyo (JP)

(72) Inventors: Yusuke Nakada, Shizuoka (JP); Takanobu Toyoshima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 33 days.

(21) Appl. No.: 17/628,268

(22) PCT Filed: Aug. 3, 2020

(86) PCT No.: PCT/JP2020/029607
§ 371 (c)(1),
(2) Date: Jan. 19, 2022

(87) PCT Pub. No.: WO2021/024970
PCT Pub. Date: Feb. 11, 2021

(65) Prior Publication Data
US 2022/0282844 A1  Sep. 8, 2022

(30) Foreign Application Priority Data
Aug. 5, 2019  (JP) ................... 2019-144032

(51) Int. Cl.
*F21S 41/19* (2018.01)
*F21S 41/25* (2018.01)
(Continued)

(52) U.S. Cl.
CPC ............. *F21S 41/19* (2018.01); *F21S 41/147* (2018.01); *F21S 41/25* (2018.01); *F21S 41/32* (2018.01); *F21S 41/40* (2018.01)

(58) Field of Classification Search
None
See application file for complete search history.

(56) References Cited

U.S. PATENT DOCUMENTS

2013/0250381 A1  9/2013  Toko et al.
2015/0224926 A1  8/2015  Mochizuki et al.
(Continued)

FOREIGN PATENT DOCUMENTS

CN  104097564 A  10/2014
EP  2 642 187 A1  9/2013
(Continued)

OTHER PUBLICATIONS

International Search Report for PCT/JP2020/029607 dated Oct. 13, 2020.
(Continued)

*Primary Examiner* — Elmito Breval
(74) *Attorney, Agent, or Firm* — Sughrue Mion, PLLC (57) ABSTRACT A vehicular lamp (1) includes a lamp unit (20), the lamp unit (20) including a light source (41) and a reflection device (50) serving as a light distribution pattern formation unit, wherein the light distribution pattern formation unit is irradiated with light (L) emitted from the light source (41) and emits light (LF) and is further capable of changing a light distribution pattern of the light (LF) to be emitted, and the lamp unit (20) adjusts an emission direction of the light (LF) to be emitted from the lamp unit (20) according to a change in the light distribution pattern of the light (LF) to be emitted from the reflection device (50).

3 Claims, 7 Drawing Sheets (51) Int. Cl.
  *F21S 41/147* (2018.01)
  *F21S 41/40* (2018.01)
  *F21S 41/32* (2018.01)

(56) References Cited

U.S. PATENT DOCUMENTS

| | | | |
|---|---|---|---|
| 2018/0142856 A1* | 5/2018 | Reinprecht | F21S 41/692 |
| 2018/0154819 A1* | 6/2018 | Hoshino | B60Q 1/50 |
| 2018/0209606 A1* | 7/2018 | Nakano | F21S 41/25 |

FOREIGN PATENT DOCUMENTS

| | | |
|---|---|---|
| JP | 6-176603 A | 6/1994 |
| JP | 2013-196957 A | 9/2013 |
| JP | 2015-005650 A | 1/2015 |
| JP | 2015-153057 A | 8/2015 |
| JP | 2015-230768 A | 12/2015 |

OTHER PUBLICATIONS

Written Opinion for PCT/JP2020/029607 dated Oct. 13, 2020.
Office Action dated Aug. 17, 2022 in Chinese Application No. 202010656858.9.

* cited by examiner

VEHICULAR LAMP

CROSS REFERENCE TO RELATED APPLICATIONS

This application is a National Stage of International Application No. PCT/JP2020/029607 filed Aug. 3, 2020, claiming priority based on Japanese Patent Application No. 2019-144032 filed Aug. 5, 2019.

TECHNICAL FIELD

The present invention relates to a vehicular lamp.

BACKGROUND ART

As vehicular lamps, vehicular headlights typified by automobile headlights, drawing devices for drawing images, for example on a road surface, and the like are known. Patent Literature 1 below discloses a vehicle including a vehicular headlight that emits light to the front of the vehicle and a drawing device that draws an image on a road surface in front of the vehicle.
[Patent Literature 1] JP 2015-153057 A

SUMMARY OF INVENTION

The vehicular headlight and the drawing device described in Patent Literature 1 may be understood as lamp units that emit lights having different light distribution patterns in different directions. Therefore, it is conceivable to integrate such two lamp units into one vehicular lamp. In the case of integrating the plurality of lamp units as described above, there is a demand for simplifying the structure of the vehicular lamp.

An object of the present invention is to provide a vehicular lamp capable of changing the emission direction of light while changing a light distribution pattern of the light to be emitted with a simple structure.

In order to achieve the above object, a vehicular lamp includes a lamp unit, the lamp unit including a light source and a light distribution pattern formation unit that is irradiated with light emitted from the light source and emits light and is further capable of changing a light distribution pattern of the light to be emitted, wherein the lamp unit adjusts an emission direction of the light to be emitted from the lamp unit according to a change in the light distribution pattern of the light to be emitted from the light distribution pattern formation unit.

This vehicular lamp can change the light distribution pattern of the light to be emitted by changing the light distribution pattern of the light to be emitted from the light distribution pattern formation unit. Therefore, the structure of the vehicular lamp can be simplified as compared with the case of including a plurality of lamp units that emit light of different light distribution patterns. Further, in this vehicular lamp, the lamp unit adjusts the emission direction of the light to be emitted according to the change in the light distribution pattern of the light to be emitted from the light distribution pattern formation unit. Therefore, the vehicular lamp can change the emission direction of light while changing the light distribution pattern of the light to be emitted with a simple structure. As a result, this vehicular lamp can emit a high beam and draw an image on a road surface or the like by one lamp unit, for example.

The lamp unit may further include a support member that supports the light source and the light distribution pattern formation unit and tilts according to the change in the light distribution pattern of light to be emitted from the light distribution pattern formation unit.

In this vehicular lamp, the emission direction of the light to be emitted from the lamp unit changes according to the tilt of the support member. Therefore, the vehicular lamp can adjust the emission direction of the light to be emitted from the lamp unit by controlling the tilt of the support member. In the vehicular lamp, the light source and the light distribution pattern formation unit are supported by the support member. Therefore, as compared with the case where the light source and the light distribution pattern formation unit are supported by different members, the vehicular lamp can suppress a relative positional deviation between the light source and the light distribution pattern formation unit, and can suppress an unintended change in the light distribution pattern. In addition, this vehicular lamp can improve the degree of freedom in the emission direction of light as compared with the case where the emission direction of the light to be emitted from the lamp unit is adjusted by the light distribution pattern formation unit changing the emission direction of the light to be emitted from the light distribution pattern formation unit.

Alternatively, the lamp unit may further include a projection lens through which the light emitted from the light distribution pattern formation unit passes, wherein the projection lens and the light distribution pattern formation unit relatively move in a direction non-parallel to a propagation direction of the light to be emitted from the light distribution pattern formation unit according to the change in the light distribution pattern of the light to be emitted from the light distribution pattern formation unit.

In this vehicular lamp, by the projection lens and the light distribution pattern formation unit relatively moving in a direction non-parallel to the propagation direction of the light to be emitted from the light distribution pattern formation unit, the emission position of the light to be emitted from the light distribution pattern formation unit in the projection lens changes, and the emission direction of the light to be emitted from the projection lens changes. Therefore, the vehicular lamp can adjust the emission direction of the light to be emitted from the lamp unit by controlling the relative movement between the projection lens and the light distribution pattern formation unit in a direction non-parallel to the propagation direction of the light to be emitted from the light distribution pattern formation unit. In addition, this vehicular lamp can improve the degree of freedom in the emission direction of light as compared with the case where the emission direction of the light to be emitted from the lamp unit is adjusted by the light distribution pattern formation unit changing the emission direction of the light to be emitted from the light distribution pattern formation unit.

Alternatively, the lamp unit may further include a projection lens through which the light emitted from the light distribution pattern formation unit passes, wherein the light distribution pattern formation unit changes an emission position of light forming the light distribution pattern according to the change in the light distribution pattern of the light to be emitted.

In this vehicular lamp, the light distribution pattern formation unit changes the emission position of the light that forms the light distribution pattern according to the change in the light distribution pattern of the light to be emitted, so that the emission position of the light to be emitted from the light distribution pattern formation unit in the projection lens changes, and the emission direction of the light to be emitted from the projection lens changes. Therefore, the vehicular lamp can adjust the emission direction of the light to be emitted from the lamp unit by controlling the emission position of the light forming the light distribution pattern in the light distribution pattern formation unit. In addition, this vehicular lamp can suppress an increase in size of the vehicular lamp as compared with a case where the emission direction of the light to be emitted from the lamp unit is adjusted by the movement of the member included in the lamp unit.

The light distribution pattern formation unit may be a reflection device including a reflection control surface formed from reflective surfaces of a plurality of reflective elements capable of individually switching a tilt state, in which the reflection control surface is irradiated with light emitted from the light source, and the reflection device reflects the light emitted from the light source with the reflection control surface to form a light distribution pattern corresponding to the tilt state of the plurality of reflective elements.

In this vehicular lamp, the light distribution pattern of the light to be emitted can be changed by changing the tilt state of the plurality of reflective elements.

Alternatively, the light distribution pattern formation unit may be a phase modulation element that diffracts the light emitted from the light source with a changeable phase modulation pattern and emits light having a light distribution pattern based on the phase modulation pattern.

In this vehicular lamp, the light distribution pattern of the light to be emitted can be changed by changing the phase modulation pattern.

As described above, according to the present invention, it is possible to provide a vehicular lamp capable of changing the emission direction of light while changing the light distribution pattern of the light to be emitted with a simple configuration.

DESCRIPTION OF EMBODIMENTS

Hereinafter, modes for carrying out a vehicular lamp according to the present invention will be exemplified together with the accompanying drawings. The embodiments exemplified below are intended to facilitate understanding of the present invention and are not intended to limit the present invention. The present invention can be modified and improved from the following embodiments without departing from the spirit thereof.

First Embodiment

Figure 1:
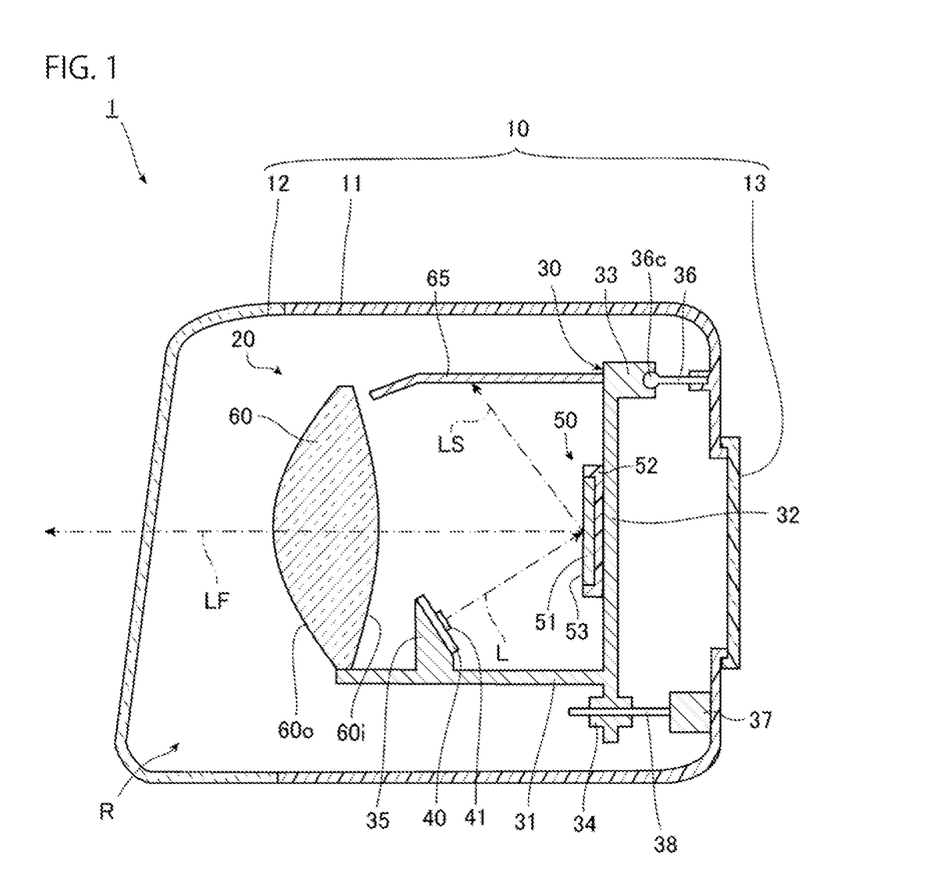
FIG. 1 is a view schematically showing a vehicular lamp according to a first embodiment of the present invention.

FIG. 1 is a view showing a vehicular lamp in the present embodiment, and schematically showing a cross section in a vertical direction of the vehicular lamp. A vehicular lamp 1 of the present embodiment is a headlight for an automobile. A headlight for an automobile is generally provided in each of left and right directions in front of a vehicle, and the left and right headlights have a substantially symmetrical configuration in the left-right direction. Therefore, in the present embodiment, one of the headlights will be described. As shown in FIG. 1, the vehicular lamp 1 of the present embodiment includes a housing 10 and a lamp unit 20 as main components.

The housing 10 includes a lamp housing 11, a front cover 12, and a back cover 13 as main components. The front of the lamp housing 11 is open, and the front cover 12 is fixed to the lamp housing 11 so as to close the opening. An opening smaller than the front opening is formed at the back of the lamp housing 11, and the back cover 13 is fixed to the lamp housing 11 so as to close the opening.

A space formed by the lamp housing 11, the front cover 12 closing the front opening of the lamp housing 11, and the back cover 13 closing the back opening of the lamp housing 11 is a lamp room R. The lamp room R accommodates a lamp unit 20.

The lamp unit 20 of the present embodiment includes a support member 30, a substrate 40, a light source 41, a reflection device 50 serving as a light distribution pattern formation unit, a projection lens 60, and a light absorbing plate 65 as main components.

The support member 30 of the present embodiment is a metal member, and includes a base plate 31, a back plate 32, a first locking portion 33, a second locking portion 34, and a fixing portion 35. The base plate 31 is a plate-like metal member extending substantially in the horizontal direction. The back plate 32 is a plate-like metal member extending substantially in the vertical direction and the left-right direction. The back end of the base plate 31 is connected to a portion on the lower side of the back plate 32. The first locking portion 33 is provided near the upper end portion of the back plate 32. The first locking portion 33 extends backward from the back plate 32 and has a groove which is open on the back side and into which a spherical body can be fitted. In this groove, a fitting portion 36c having substantially spherical shape formed at a tip portion of a stud bolt 36 having one end fixed to the lamp housing 11 is fitted.

The second locking portion 34 is provided in a portion of the back plate 32 positioned lower than the base plate 31. The second locking portion 34 extends forward and backward from the back plate 32, and has a screw hole penetrating in the front-back direction. To the lamp housing 11, a leveling unit 37 having an aiming bolt 38 rotatable by a motor or a gear which is not shown is fixed. The aiming bolt 38 is screwed into the screw hole in the second locking portion 34. In this manner, the support member 30 is attached to the lamp housing 11 via the stud bolt 36 and the leveling unit 37. The support member 30 tilts in the front-back direction with the fitting portion 36c as a fulcrum by rotating the aiming bolt 38 of the leveling unit 37. The leveling unit 37 is connected to a leveling driving circuit not shown, and an output shaft of the motor rotates in accordance with power supply from the leveling driving circuit to the motor, to rotate the aiming bolt 38.

The fixing portion 35 is provided in a portion of the base plate 31 in front of the back plate 32. The fixing portion 35 extends upward from the base plate 31. The distal end surface of the fixing portion 35 is tilted so as to approach the base plate 31 from the front side toward the back side.

The substrate 40 is disposed on the distal end surface of the fixing portion 35, and a light source 41 that is a light emitting element is mounted on the substrate 40. Because the distal end surface of the fixing portion 35 is tilted as described above, the light source 41 emits light backward and upward. The light emitted from the light source 41 is applied to a reflection control surface of the reflection device 50 described later. In the present embodiment, the light source 41 is a surface mount light emitting diode (LED) whose light emitting surface is substantially rectangular and emits white light. The light source 41 is connected to a power circuit, which is not shown, provided on the substrate 40, and emits light by power supply from the power circuit.

The reflection device 50 serving as a light distribution pattern formation unit is irradiated with light and emits light and is further capable of changing the light distribution pattern of the light to be emitted. The reflection device 50 of the present embodiment is a so-called digital mirror device (DMD), and includes a reflection unit 51 and an edge cover 52 as main components as shown in FIG. 1. In FIG. 1, illustration of the inside of the reflection unit 51 is omitted. The reflection unit 51 includes a reflection control surface 53 that reflects incident light to emit light and can change the light distribution pattern of the light to be emitted. The reflection control surface 53 is irradiated with the light emitted from the light source 41. Although a description by illustration is omitted, the reflection unit 51 of the present embodiment is formed in a substantially rectangular shape in a front view from the reflection control surface 53 side, and the entire region in the front view is the reflection control surface 53. The edge cover 52 covers the entire circumference of the side surface of the reflection unit 51 and the side opposite to the reflection control surface 53. The reflection control surface 53 is exposed outward without being covered by the edge cover 52. The edge cover 52 is not particularly limited, and for example, it may not cover the back surface side of the reflection unit 51, and the reflection device 50 may not include the edge cover 52.

Figure 2:
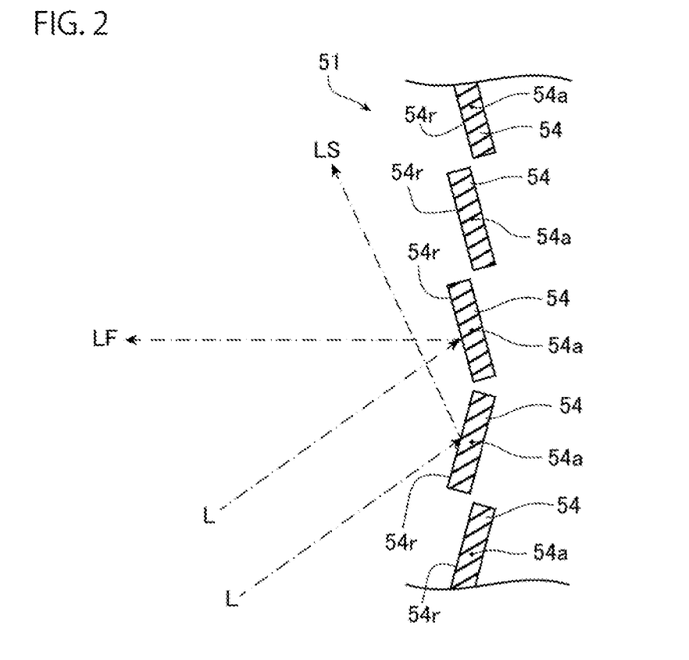
FIG. 2 is a view schematically showing a cross section in a thickness direction of a part of a reflection unit shown in FIG. 1.

FIG. 2 is a view schematically showing a cross section in a thickness direction of a part of the reflection unit shown in FIG. 1, and schematically showing a cross section in a vertical direction of a part of the reflecting portion. The reflection unit 51 of the present embodiment includes a plurality of reflective elements 54 two-dimensionally arranged on a substrate not shown. The reflection control surface 53 of the reflection unit 51 is formed from reflective surfaces 54r of the plurality of reflective elements 54. The plurality of reflective elements 54 are supported on the substrate such that they can individually tilt with a corresponding rotation axis 54a as the center. The plurality of reflective elements 54 can be individually switched between a first tilt state in which the reflective element tilts at a predetermined angle to one side and a second tilt state in which the reflective element tilts at a predetermined angle to the other side. The reflection unit 51 is connected to a reflection unit driving circuit not shown, and the tilt states of each reflective element 54 are switched according to the voltage applied to each reflective element 54 by the reflection unit driving circuit.

In the present embodiment, the rotation axes 54a of the plurality of reflective elements 54 are substantially parallel to each other, and each reflective element 54 reflects the light from the light source 41 incident on the reflective surface 54r toward a first direction in the first tilt state. On the other hand, each reflective element 54 reflects the light from the light source 41 incident on the reflective surface 54r toward a second direction different from the first direction in the second tilt state. The plurality of reflective elements 54 only need to be able to reflect the light from the light source 41 incident on the reflective surface 54r toward the first direction in the first tilt state. For example, the plurality of reflective elements 54 may include a plurality of reflective elements in which the second direction different from the first direction is different from each other. That is, the rotation axes 54a of the plurality of reflective elements 54 may not be parallel to each other.

As described above, the plurality of reflective elements 54 can be individually switched between the first tilt state in which the reflective element tilts to one side at a predetermined angle and the second tilt state in which the reflective element tilts to the other side at a predetermined angle. Therefore, the reflection unit 51 can form a predetermined light distribution pattern by, for example, the light emitted from the reflection control surface 53 toward the first direction by controlling the tilt state of the reflective elements 54. In addition, by controlling the tilt state of these reflective elements 54 over time, the light intensity distribution in a predetermined light distribution pattern can be set to a predetermined intensity distribution. For example, the amount of the light per unit time emitted in the first direction from the reflective element 54 repeatedly switched between the first tilt state and the second tilt state at predetermined time intervals is lower than the amount of light per unit time emitted in the first direction from the reflective element 54 that is always in the first tilt state. In this manner, the amount of the light emitted from each reflective element 54 toward the first direction per unit time changes depending on the difference in the tilt state of the reflective element 54 over time. Therefore, by controlling the tilt state of the plurality of reflective elements 54 over time, the intensity distribution of the light in the light distribution pattern of the light emitted in the first direction can be set to a predetermined intensity distribution. In this manner, the reflection device 50 can reflect the light emitted from the light source 41 by the reflection control surface 53 to form the light distribution pattern corresponding to the tilt state of the plurality of reflective elements 54. Therefore, the reflection device 50 can change the light distribution pattern of the light to be emitted by changing the tilt state of the plurality of reflective elements 54. The number, shape, arrangement, size, and the like of the plurality of reflective elements 54 are not particularly limited. The reflection control surface 53 may be covered with a member having translucency.

The reflection device 50 as described above is fixed on the front surface of the back plate 32 such that the reflection control surface 53 is irradiated with light from the light source 41, the first direction is a direction toward the front side, and the second direction is a direction toward the front side and the upper side. Specifically, the reflection device 50 of the present embodiment is fixed on the front surface of the back plate 32 so that the reflection control surface 53 extends in the vertical direction and the left-right direction, and the extending direction of the rotation axes 54a of the plurality of reflective elements 54 are substantially parallel to the left-right direction.

The projection lens 60 is a lens that adjusts a divergence angle of incident light. The projection lens 60 of the present embodiment is fixed to the upper surface side of the front end portion of the base plate 31. The projection lens 60 is located in front of the reflection device 50. Light emitted from the reflection control surface 53 toward the first direction is incident on the projection lens 60, and the divergence angle of the light is adjusted by the projection lens 60. The light whose divergence angle has been adjusted by the projection lens 60 in this manner is emitted from the vehicular lamp 1 via the front cover 12. That is, the light emitted from the reflection control surface 53 toward the first direction passes through the projection lens 60 and is emitted from the vehicular lamp 1 via the front cover 12. In the present embodiment, the projection lens 60 is a lens in which each of an incident surface 60$i$ and an emission surface 60$o$ is formed in a convex shape, and is arranged such that the rear focal point is positioned on or near the reflection control surface 53 of the reflection device 50.

The light absorbing plate 65 is a plate-like member having a light absorbing property, and is formed to convert most of incident light into heat. In the present embodiment, the light absorbing plate 65 is located above the reflection device 50 and extends in the front-back direction. The front end of the light absorbing plate 65 is positioned near the incident surface 60$i$ of the projection lens 60, the back end of the light absorbing plate 65 is connected to the back plate 32, and the light absorbing plate 65 is fixed to the back plate 32. Light emitted from the reflection control surface 53 toward the second direction is incident on the light absorbing plate 65, and most of the light is converted into heat. Examples of the light absorbing plate 65 include a plate-like member made of metal such as aluminum and having a surface subjected to black alumite processing or the like. The light absorbing plate 65 may be formed integrally with the back plate 32 to be a part of the back plate 32, or may be formed integrally with the lamp housing 11 to be a part of the lamp housing 11.

Figure 3:
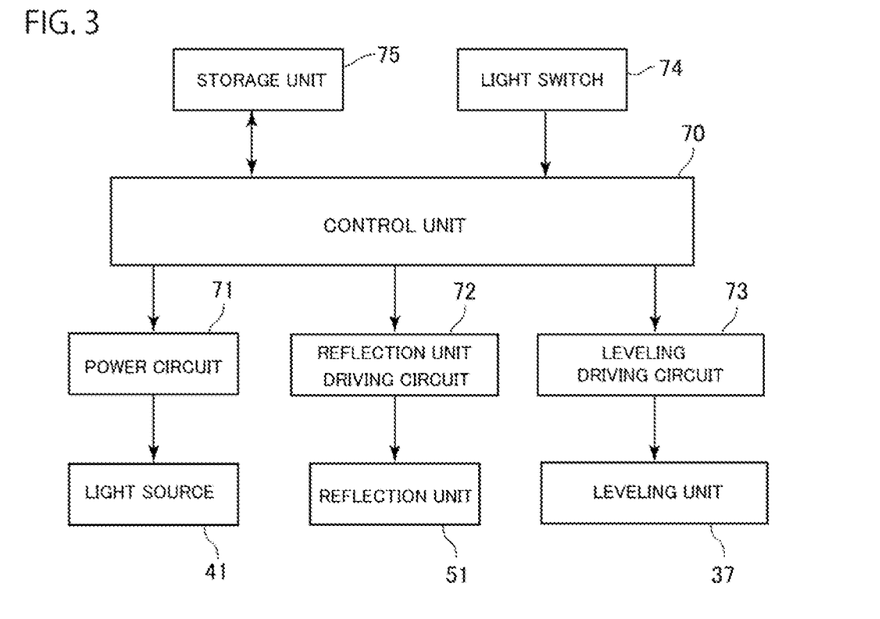
FIG. 3 is a block diagram including the vehicular lamp according to the first embodiment of the present invention.

FIG. 3 is a block diagram including the vehicular lamp according to the present embodiment. As shown in FIG. 3, in the present embodiment, a power circuit 71, a reflection unit driving circuit 72, a leveling driving circuit 73, a light switch 74, a storage unit 75, and the like are electrically connected to the control unit 70. The control unit 70 may be provided in the lamp unit 20 or may be a part of an electronic control unit of the vehicle. In addition, the light switch 74 may be electrically connected to the control unit 70 via an electronic control unit of the vehicle.

The control unit 70 controls the leveling unit 37, the light source 41, and the reflection device 50 according to a signal from the light switch 74. Examples of the control unit 70 include a central processing unit (CPU) that performs arithmetic processing, and a microcontroller having a main storage device in which a control program, information, and the like are stored, a timer, an input circuit, an output circuit, and the like. Examples of the main storage device include semiconductor memories such as a read only memory (ROM) and a random access memory (RAM). The control unit 70 may have a machine learning function.

The power circuit 71 is electrically connected to the light source 41, and a power source, which is not shown, is connected to the power circuit 71. The power circuit 71 supplies predetermined power to the light source 41 based on the signal input from the control unit 70. The power circuit 71 may adjust the power supplied from the power source to the light source 41 based on the signal input from the control unit 70 to adjust the intensity of the light to be emitted from the light source 41.

The reflection unit driving circuit 72 is electrically connected to the reflection unit 51. Based on the signal input from the control unit 70, the reflection unit driving circuit 72 adjusts the voltage to be applied to the reflection unit 51 to individually adjust the tilt states of the plurality of reflective elements 54.

The leveling driving circuit 73 is electrically connected to the leveling unit 37. Based on a signal input from the control unit 70, the leveling driving circuit 73 adjusts the rotation of the motor of the leveling unit 37 to rotate the aiming bolt 38, thereby adjusting the tilt angle of the support member 30 in the front-back direction.

The light switch 74 is a switch with which a driver gives an instruction to emit or not to emit light from the vehicular lamp 1. The vehicular lamp 1 of the present embodiment can emit a high beam and draw a predetermined image on a road surface or the like, and the light switch 74 of the present embodiment allows selection of emission of a high beam or drawing of an image together with emission or non-emission of light, the details of which will be described later.

The storage unit 75 can store information and read the stored information. Examples of the storage unit 75 include a semiconductor memory such as a ROM, and a magnetic disk. The storage unit 75 of the present embodiment stores a table in which information on the light distribution pattern formed by the light emitted from the reflection control surface 53 of the reflection unit 51 toward the first direction and information on the tilt angle of the support member 30 are associated with each other. The vehicular lamp 1 of the present embodiment can emit a high beam and draw a predetermined image on a road surface or the like, and adjusts the emission direction of light to be emitted from the lamp unit 20 according to each case, the details of which will be described later. In the present embodiment, the light distribution pattern formed by the light emitted from the reflection control surface 53 of the reflection unit 51 toward the first direction is a high beam light distribution pattern and a light distribution pattern for drawing a predetermined image, and the information on these light distribution patterns is patterns of the voltage applied to the reflection unit 51. Furthermore, the information on the tilt angle of the support member 30 is information on the tilt angle of the support member 30 in the front-back direction with the fitting portion 36$c$ as a fulcrum, and the information on the tilt angle is the rotation angle of the aiming bolt 38 of the leveling unit 37. The rotation angle associated with the pattern of the voltage applied to the reflection unit 51 when a high beam is emitted is different from the rotation angle associated with the pattern of the voltage applied to the reflection unit 51 when a predetermined image is drawn.

Figure 4:
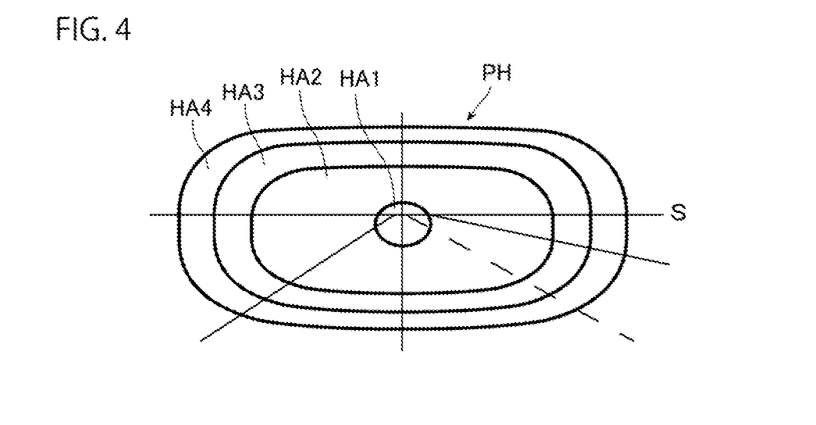
FIG. 4 is a view showing a high beam light distribution pattern.

FIG. 4 is a view showing a high beam light distribution pattern, in which S indicates a horizontal line, and the light distribution pattern is indicated by thick lines. In a high beam light distribution pattern PH shown in FIG. 4, a region HA1 is a region having the highest light intensity. The light intensity decreases in the order of a region HA2, a region HA3, and a region HA4. That is, the tilt state of the plurality of reflective elements 54 of the reflection unit 51 is controlled such that a light LF emitted from the reflection control surface 53 toward the first direction becomes light forming a light distribution pattern including a high beam intensity distribution.

Figure 5:
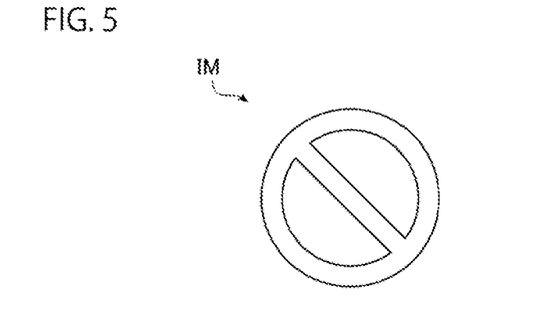
FIG. 5 is a view schematically showing one example of an image to be drawn.

FIG. 5 is a view schematically showing one example of an image to be drawn. An image IM shown in FIG. 5 is a mark similar to a parking prohibition sign as viewed from a driver.

That is, the tilt state of the plurality of reflective elements 54 of the reflection unit 51 is controlled such that the light LF emitted from the reflection control surface 53 toward the first direction is light forming the light distribution pattern constituting the image IM shown in FIG. 5. By drawing the image IM shown in FIG. 5 on the road surface in front of the vehicle, it is possible to display the intention of the user that the user does not want the person outside the vehicle to park at the portion where the image IM is drawn.

Next, an operation of the vehicular lamp 1 will be described. Specifically, an operation of switching between emission of a high beam and drawing of a predetermined image will be described.

In the present embodiment, when the light switch 74 is turned on and a signal for giving an instruction to emit light and select a high beam is input from the light switch 74 to the control unit 70, the control unit 70 controls the light source 41, the reflection unit 51, and the leveling unit 37 so that the light LF emitted from the reflection control surface 53 of the reflection unit 51 toward the first direction becomes light forming the high beam light distribution pattern and the tilt angle of the support member 30 becomes an angle corresponding to the high beam. Specifically, the control unit 70 outputs a predetermined signal to the power circuit 71, and the power circuit 71 supplies predetermined power to the light source 41 based on the signal input from the control unit 70. As a result, the light source 41 emits a white light L having a predetermined intensity, and the reflection control surface 53 is irradiated with the light L. In the present embodiment, substantially the entire surface of the reflection control surface 53 is irradiated with the light L.

In addition, the control unit 70 refers to the table stored in the storage unit 75 based on the signal input from the light switch 74, and outputs a signal based on the voltage pattern corresponding to the high beam light distribution pattern PH to the reflection unit driving circuit 72. Based on this signal input from the control unit 70, the reflection unit driving circuit 72 controls the voltage applied to each reflective element 54, and controls the tilt state of each reflective element 54. As a result, the light distribution pattern formed by the light LF emitted from the reflection control surface 53 of the reflection unit 51 toward the first direction becomes the high beam light distribution pattern PH. The light LF is transmitted through the projection lens 60 and emitted from the lamp unit 20. Note that most of light LS emitted from the reflection control surface 53 toward the second direction is incident on the light absorbing plate 65 and is converted into heat.

Based on the signal input from the light switch 74, the control unit 70 refers to the table stored in the storage unit 75, and outputs a signal based on the tilt angle of the support member 30 corresponding to the high beam light distribution pattern PH to the leveling driving circuit 73. Based on this signal input from the control unit 70, the leveling driving circuit 73 adjusts the rotation of the motor of the leveling unit 37 to rotate the aiming bolt 38, thereby adjusting the tilt angle of the support member 30 in the front-back direction. As a result, the tilt angle of the support member 30 becomes a tilt angle corresponding to the high beam light distribution pattern PH. As described above, because the light source 41, the reflection device 50, the projection lens 60, and the light absorbing plate 65 are supported by the support member 30, when the support member 30 tilts, these members tilt while maintaining a positional relationship with each other. Therefore, the emission direction of the light emitted from the projection lens 60, that is, the emission direction of the light LF emitted from the lamp unit 20 is a direction corresponding to the tilt angle of the support member 30, and the light LF emitted from the lamp unit 20 is emitted from the vehicular lamp 1 via the front cover 12. In the present embodiment, the emission direction of the light LF emitted from the lamp unit 20 in this case is substantially the horizontal direction. As described above, because the light distribution pattern formed by the light LF emitted from the reflection control surface 53 toward the first direction is the high beam light distribution pattern PH, light having the high beam light distribution pattern PH is emitted from the vehicular lamp 1.

In this manner, when the selection of the high beam in the light switch 74 is switched to the drawing of the image in a state where the light having the high beam light distribution pattern PH is emitted from the vehicular lamp 1, the control unit 70 controls the reflection unit 51 and the leveling unit 37 so that the light LF emitted from the reflection control surface 53 of the reflection unit 51 toward the first direction becomes the light forming the light distribution pattern constituting the predetermined image and the tilt angle of the support member 30 becomes an angle corresponding to the drawing of the predetermined image. Specifically, the control unit 70 refers to the table stored in the storage unit 75 based on the signal input from the light switch 74 and outputs a signal based on the voltage pattern corresponding to the light distribution pattern constituting the predetermined image to the reflection unit driving circuit 72. Based on this signal input from the control unit 70, the reflection unit driving circuit 72 controls the voltage applied to each reflective element 54, and controls the tilt state of each reflective element 54. As a result, the light distribution pattern formed by the light LF emitted from the reflection control surface 53 of the reflection unit 51 toward the first direction becomes the light distribution pattern constituting a predetermined image, and the light LF is transmitted through the projection lens 60 and emitted from the lamp unit 20.

Based on the signal input from the light switch 74, the control unit 70 refers to the table stored in the storage unit 75 and outputs a signal based on the tilt angle of the support member 30 corresponding to the light distribution pattern constituting the predetermined image to the leveling driving circuit 73. Based on this signal input from the control unit 70, the leveling driving circuit 73 adjusts the rotation of the motor of the leveling unit 37 to rotate the aiming bolt 38, thereby adjusting the tilt angle of the support member 30 in the front-back direction. As a result, the tilt angle of the support member 30 becomes a tilt angle corresponding to the light distribution pattern constituting the predetermined image. The light source 41, the reflection device 50, the projection lens 60, and the light absorbing plate 65 tilt according to the tilt of the support member 30 while maintaining a positional relationship with each other. Therefore, the emission direction of the light LF to be emitted from the lamp unit 20 becomes a direction corresponding to the tilt angle of the support member 30. In the present embodiment, the emission direction of the light LF to be emitted from the lamp unit 20 in this case is an obliquely downward direction. Therefore, it can be understood that the lamp unit 20 adjusts the emission direction of the light LF to be emitted from the lamp unit 20 according to the change in the light distribution pattern of the light LF to be emitted from the reflection device 50 serving as the light distribution pattern formation unit. As described above, because the light distribution pattern formed by the light LF emitted from the reflection control surface 53 toward the first direction is the light distribution pattern constituting a predetermined image, light having the light distribution pattern constituting the predetermined image is emitted from the vehicular lamp 1, and the predetermined image is drawn on the road surface or the like in front of the vehicle. The control unit 70 controls the light source 41 so that the light source 41 keeps emitting the white light L having a predetermined intensity.

As described above, the vehicular lamp 1 of the present embodiment includes the lamp unit 20 including the light source 41 and the reflection device 50 serving as the light distribution pattern formation unit. The reflection device 50 serving as the light distribution pattern formation unit is irradiated with the light L emitted from the light source 41 and emits the light LF and can further change the light distribution pattern of the light LF to be emitted. The lamp unit 20 adjusts the emission direction of the light LF to be emitted from the lamp unit 20 according to the change in the light distribution pattern of the light LF to be emitted from the reflection device 50.

In the vehicular lamp 1 of the present embodiment, the light distribution pattern of the light LF to be emitted can be changed by changing the light distribution pattern of the light LF to be emitted from the reflection device 50 serving as the light distribution pattern formation unit. Therefore, the structure of the vehicular lamp 1 can be simplified as compared with the case of including a plurality of lamp units that emit light of different light distribution patterns. In addition, in the vehicular lamp 1 of the present embodiment, the lamp unit 20 adjusts the emission direction of the light LF to be emitted from the lamp unit 20 according to the change in the light distribution pattern of the light LF to be emitted from the reflection device 50 serving as the light distribution pattern formation unit. Therefore, this vehicular lamp can change the emission direction of the light LF while changing the light distribution pattern of the light LF to be emitted with a simple structure. Therefore, in the vehicular lamp 1 of the present embodiment, it is possible to emit a high beam and draw an image on a road surface or the like with one lamp unit.

In the vehicular lamp 1 of the present embodiment, the lamp unit 20 further includes the support member 30. The support member 30 supports the light source 41 and the reflection device 50 serving as the light distribution pattern formation unit, and tilts according to the change in the light distribution pattern of the light LF to be emitted from the reflection device 50.

Therefore, in the vehicular lamp 1 of the present embodiment, the emission direction of the light to be emitted from the lamp unit 20 changes according to the tilt of the support member 30. Therefore, the vehicular lamp 1 of the present embodiment can adjust the emission direction of the light to be emitted from the lamp unit 20 by controlling the tilt of the support member 30. In the vehicular lamp 1 of the present embodiment, the light source 41 and the reflection device 50 serving as the light distribution pattern formation unit are supported by the support member 30. Therefore, as compared with the case where the light source 41 and the reflection device 50 are supported by different members, the vehicular lamp 1 of the present embodiment can suppress a relative positional deviation between the light source 41 and the reflection device 50, and can suppress an unintended change in the light distribution pattern. In addition, the vehicular lamp 1 of the present embodiment can improve the degree of freedom in the emission direction of the light as compared with the case where the reflection device 50 changes the emission direction of the light LF to be emitted from the reflection device 50 to adjust the emission direction of the light to be emitted from the lamp unit.

In the vehicular lamp 1 of the present embodiment, the light distribution pattern formation unit is the reflection device 50. The reflection device 50 includes a reflection control surface 53 that is formed from the reflective surfaces 54r of the plurality of reflective elements 54 capable of individually switching the tilt state. The reflection control surface 53 is irradiated with the light L emitted from the light source 41. The reflection device 50 reflects the light L emitted from the light source 41 by the reflection control surface 53 to form a light distribution pattern corresponding to the tilt state of the plurality of reflective elements 54.

Therefore, in the vehicular lamp 1 of the present embodiment, the light distribution pattern of the light to be emitted can be changed by changing the tilt state of the plurality of the reflective elements 54.

The vehicular lamp 1 of the present embodiment further includes the projection lens 60 that adjusts the divergence angle of the light LF emitted from the reflection control surface 53 and forming the light distribution pattern according to the tilt state of the plurality of reflective elements 54.

With such a structure, it is easy for the light distribution pattern to be emitted to have a desired size as compared with the case where the projection lens 60 is not provided In the present embodiment, the support member 30 can tilt in the front-back direction by rotating the aiming bolt 38 of the leveling unit 37. However, the support member 30 only needs to support the light source 41 and the reflection device 50 serving as the light distribution pattern formation unit and tilt according to the change in the light distribution pattern of the light emitted from the reflection device 50. The structure of supporting the light source 41 and the reflection device 50 and the structure of tilting the support member 30 are not particularly limited.

Second Embodiment

Next, a second embodiment of the present invention will be described in detail with reference to FIG. 6. The same or equivalent components as those of the first embodiment are denoted by the same reference numerals and overlapping description is omitted unless otherwise specified.

Figure 6:
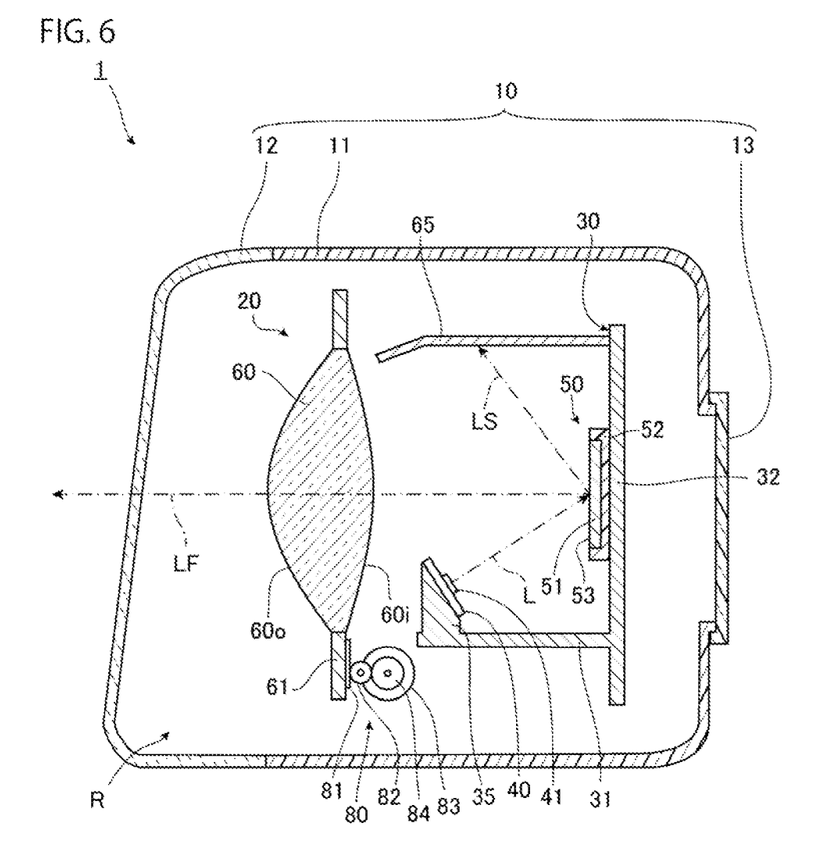
FIG. 6 is a view showing a vehicular lamp according to a second embodiment of the present invention in the same manner as in FIG. 1.

FIG. 6 is a view showing a vehicular lamp according to the second embodiment of the present invention in the same manner as in FIG. 1. As shown in FIG. 6, the lamp unit 20 of the present embodiment is different from the lamp unit 20 of the first embodiment mainly in that a lens moving device 80 is provided instead of the leveling unit 37.

In the present embodiment, the support member 30 supports the light source 41, the reflection device 50 serving as the light distribution pattern formation unit, and the light absorbing plate 65 as in the first embodiment, but does not support the projection lens 60. The positional relationship between the light source 41, the reflection device 50, and the light absorbing plate 65 is the same as that in the first embodiment. The support member 30 is fixed to the housing 10 with a structure not shown such that the light LF emitted in the first direction from the reflection control surface 53 of the reflection unit 51 in the reflection device 50 is incident on the projection lens 60 disposed in front of the reflection device 50. Therefore, the light emitted from the reflection device 50 propagates from the back side toward the front side.

The projection lens 60 of the present embodiment is a lens in which the incident surface 60i and the emission surface 60o are each formed in a convex shape as in the first embodiment. In the present embodiment, the projection lens 60 is held not by the support member 30 but by a plate-like lens holding member 61 connected to the outer peripheral edge of the projection lens 60 and extending substantially in the vertical direction. The lens holding member 61 is supported by the housing 10 with a structure not shown to be movable in the extending direction of the lens holding member 61.

The lens moving device 80 of the present embodiment includes a rack 81, a pinion 82, a motor 83, and a gear 84 attached to an output shaft of the motor 83. The rack 81 is fixed to a surface of the lens holding member 61 on the light source 41 side below the projection lens 60. The pinion 82 meshes with the rack 81 and the gear 84, and power of the motor 83 transmits to the lens holding member 61 via the gear 84, the pinion 82, and the rack 81. The lens holding member 61 is movable substantially in the vertical direction by the power of the motor 83. As described above, the light LF emitted from the reflection device 50 supported by the support member 30 fixed to the housing 10 propagates from the back side toward the front side. Therefore, it can be understood that the projection lens 60 held by the lens holding member 61 and the reflection device 50 serving as the light distribution pattern formation unit supported by the support member 30 as described above are relatively movable in a direction non-parallel to the propagation direction of the light to be emitted from the reflection device 50.

The control unit 70 of the present embodiment controls the light source 41, the reflection unit 51, and the lens moving device 80 based on a signal input from the light switch 74. In the present embodiment, when the light switch 74 is turned on and a signal for giving an instruction to emit light and select a high beam is input from the light switch 74 to the control unit 70, the control unit 70 controls the light source 41 so that the light source 41 emits white light L having a predetermined intensity, and the reflection control surface 53 is irradiated with the light L, in the same manner as in the first embodiment. The control unit 70 controls the reflection device 50 so that the light distribution pattern formed by the light LF emitted from the reflection control surface 53 of the reflection unit 51 toward the first direction becomes the high beam light distribution pattern PH, in the same manner as in the first embodiment. Note that most of the light LS emitted from the reflection control surface 53 toward the second direction is incident on the light absorbing plate 65 and converted into heat as in the first embodiment.

In addition, the control unit 70 of the present embodiment controls the lens moving device 80 so that the position of the projection lens 60 in the vertical direction with respect to the reflection device 50 becomes a predetermined first position based on the signal input from the light switch 74. In the present embodiment, the predetermined first position of the projection lens 60 with respect to the reflection device 50 is a position at which the light LF emitted from substantially the center of the reflection control surface 53 of the reflection device 50 passes through the center of the projection lens 60. In this manner, the light LF emitted from the reflection device 50 passes through the projection lens 60, is emitted from the lamp unit 20, and is emitted from the vehicular lamp 1 via the front cover 12. In the present embodiment, as in the first embodiment, because the light distribution pattern formed by the light LF emitted from the reflection control surface 53 toward the first direction is the high beam light distribution pattern PH, light having the high beam light distribution pattern PH is emitted from the vehicular lamp 1.

In this manner, when the selection of the high beam in the light switch 74 is switched to the drawing of the image in a state where the light having the high beam light distribution pattern PH is emitted from the vehicular lamp 1, the control unit 70 controls the reflection unit 51 so that the light LF emitted from the reflection control surface 53 of the reflection unit 51 toward the first direction becomes the light forming the light distribution pattern constituting the predetermined image, as in the first embodiment.

Figure 7:
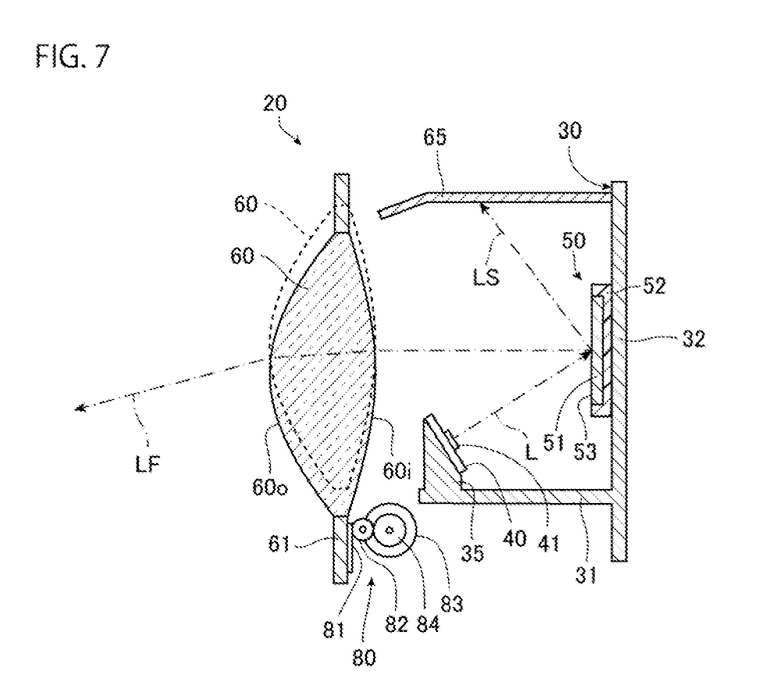
FIG. 7 is a view showing one example of a state of a lamp unit when a projection lens moves.

Furthermore, the control unit 70 of the present embodiment controls the lens moving device 80 so that the position of the projection lens 60 in the vertical direction with respect to the reflection device 50 becomes a predetermined second position moved downward from the predetermined first position based on the signal input from the light switch 74. When the position of the projection lens 60 in the vertical direction with respect to the reflection device 50 becomes the predetermined second position moved downward with respect to the predetermined first position, the emission position of the light LF emitted from the reflection device 50 on the emission surface 60o of the projection lens 60 changes as shown in FIG. 7. As a result, the emission direction of the light LF from the emission surface 60o of the projection lens 60 changes. Here, FIG. 7 is a view showing one example of a state of the lamp unit 20 when the projection lens 60 moves. The projection lens 60 in the first position is indicated by broken lines in FIG. 7. In FIG. 7, description of the housing 10 is omitted for easy understanding. In the present embodiment, the shapes of the incident surface 60i and the emission surface 60o of the projection lens 60 are adjusted such that the emission direction of the light LF from the projection lens 60 when the position of the projection lens 60 with respect to the reflection device 50 is in the second position is downward with respect to the emission direction of the light LF from the projection lens 60 when the position of the projection lens 60 with respect to the reflection device 50 is in the first position. Therefore, the emission direction of the light LF to be emitted from the lamp unit 20 becomes a downward direction as compared with the case where the light LF is light forming the high beam light distribution pattern. Therefore, it can be understood that the lamp unit 20 of the present embodiment adjusts the emission direction of the light LF to be emitted from the lamp unit 20 according to the change in the light distribution pattern of the light LF to be emitted from the reflection device 50 serving as the light distribution pattern formation unit, in the same manner as in the lamp unit 20 of the first embodiment. As described above, because the light distribution pattern formed by the light LF emitted from the reflection control surface 53 toward the first direction is the light distribution pattern constituting a predetermined image, light having the light distribution pattern constituting the predetermined image is emitted from the vehicular lamp 1, and the predetermined image is drawn on the road surface or the like in front of the vehicle. The control unit 70 controls the light source 41 so that the light source 41 keeps emitting the white light L having a predetermined intensity. Furthermore, the storage unit 75 stores information for the control unit 70 to control the lens moving device 80 as described above, and the control unit 70 outputs a control signal to the driving circuit electrically connected to the lens moving device 80 based on the information. The driving circuit adjusts the rotation of the motor 83 of the lens moving device 80 based on the control signal from the control unit 70. In this manner, the control unit 70 controls the lens moving device 80.

As described above, in the same manner as in the vehicular lamp 1 of the first embodiment, the vehicular lamp 1 of the present embodiment can change the emission direction of the light LF while changing the light distribution pattern of the light LF to be emitted with a simple structure as compared with the case of including a plurality of lamp units that emit light having different light distribution patterns.

In the vehicular lamp 1 of the present embodiment, as described above, the lamp unit 20 includes the projection lens 60 through which the light LF emitted from the reflection device 50 serving as the light distribution pattern formation unit passes. In addition, according to the change in the light distribution pattern of the light LF to be emitted from the reflection device 50, the projection lens 60 and the reflection device 50 relatively move in a direction non-parallel to the propagation direction of the light LF to be emitted from the reflection device 50. As described above, in the vehicular lamp 1 of the present embodiment, the projection lens 60 and the reflection device 50 relatively move in a direction non-parallel to the propagation direction of the light LF to be emitted from the reflection device 50, whereby the emission position of the light LF to be emitted from the reflection device 50 on the emission surface 60o of the projection lens 60 changes, and the emission direction of the light to be emitted from the projection lens 60 changes. Therefore, the vehicular lamp 1 of the present embodiment can adjust the emission direction of the light to be emitted from the lamp unit 20 by controlling the relative movement between the projection lens 60 and the reflection device 50. In addition, the vehicular lamp 1 of the present embodiment can improve the degree of freedom in the emission direction of light as compared with the case where the reflection device 50 changes the emission direction of the light LF to be emitted from the reflection device 50 to adjust the emission direction of the light to be emitted from the lamp unit 20. In addition, in the vehicular lamp 1 of the present embodiment, the relative position between the projection lens 60 and the reflection device 50 changes as the projection lens 60, which is an optical element that does not require electric power, moves. Therefore, for example, as compared with the case where the reflection device 50, which is an optical element requiring electric power, moves, it is possible to suppress occurrence of damage such as disconnection, and it is possible to suppress a decrease in reliability.

The projection lens 60 and the reflection device 50 only need to relatively move in a direction non-parallel to the propagation direction of the light LF to be emitted from the reflection device 50. For example, the reflection device 50 may move, or the projection lens 60 and the reflection device 50 may move. Furthermore, the moving directions of the projection lens 60 and the reflection device 50 and the structure for moving them are not particularly limited.

Third Embodiment

Next, a third embodiment of the present invention will be described in detail with reference to FIG. 8. The same or equivalent components as those of the first embodiment are denoted by the same reference numerals and overlapping description is omitted unless otherwise specified.

Figure 8:
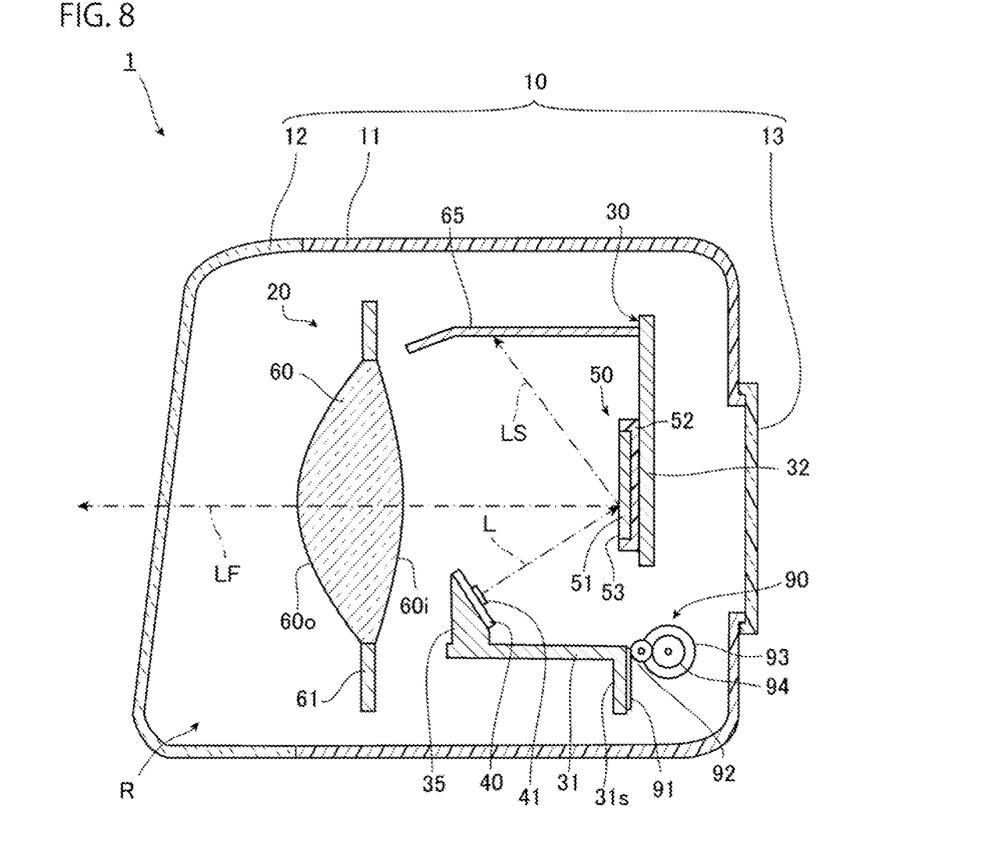
FIG. 8 is a view showing a vehicular lamp according to a third embodiment of the present invention in the same manner as in FIG. 1.

FIG. 8 is a view showing a vehicular lamp according to the third embodiment of the present invention in the same manner as in FIG. 1. As shown in FIG. 8, the lamp unit 20 of the present embodiment is different from the lamp unit 20 of the first embodiment mainly in that a plate moving device 90 is provided instead of the leveling unit 37, and the base plate 31 and the back plate 32 of the support member 30 are separated.

In the present embodiment, as in the first embodiment, the reflection device 50 and the light absorbing plate 65 are supported by the back plate 32 of the support member 30, and the back plate 32 is fixed to the housing 10 by a structure not shown. On the other hand, the light source 41 is disposed on the base plate 31 of the support member 30 as in the first embodiment. In addition, the base plate 31 of the present embodiment has a connecting portion 31s extending in the vertical direction so as to be substantially parallel to the reflection control surface 53 of the reflection device 50 at the back end portion. The base plate 31 is supported by the housing 10 by a structure not shown so as to be movable in the extending direction of the connecting portion 31s. The direction substantially parallel to the reflection control surface 53 here is, for example, a direction substantially parallel to the reflection control surface 53 in the case where the tilt states of the plurality of reflective elements 54 are in a state where the reflective surfaces 54r of the plurality of reflective elements 54 are located on the same plane.

The projection lens 60 of the present embodiment is a lens in which the incident surface 60i and the emission surface 60o are each formed in a convex shape as in the first embodiment. In the present embodiment, as in the second embodiment, the projection lens 60 is held by a plate-like lens holding member 61 connected to the outer peripheral edge of the projection lens 60 and extending substantially in the vertical direction. The lens holding member 61 is fixed to the housing 10 with a structure not shown. In the present embodiment, the focal point on the rear side of the projection lens 60 is located on or near the reflection control surface 53 of the reflection device 50, and the optical axis of the projection lens 60 intersects with a region located lower than the center of the reflection control surface 53 in the reflection control surface 53.

The plate moving device 90 of the present embodiment includes a rack 91, a pinion 92, a motor 93, and a gear 94 attached to an output shaft of the motor 93. The rack 91 is fixed to the back surface of the connecting portion 31s of the base plate 31. The pinion 92 meshes with the rack 91 and the gear 94, and power of the motor 93 transmits to the base plate 31 via the gear 94, the pinion 92, and the rack 91. The base plate 31 is movable in the vertical direction substantially parallel to the reflection control surface 53 of the reflection device 50 by the power of the motor 93. As described above, the reflection device 50 is supported by the back plate 32 fixed to the housing 10. Therefore, it can be understood that the light source 41 supported by the base plate 31 and the reflection device 50 supported by the back plate 32 as described above are relatively movable.

The control unit 70 of the present embodiment controls the light source 41, the reflection unit 51, and the plate moving device 90 based on a signal input from the light switch 74. In the present embodiment, when the light switch 74 is turned on and a signal for giving an instruction to emit light and select a high beam is input from the light switch 74 to the control unit 70, the control unit 70 controls the light source 41 so that the light source 41 emits white light L having a predetermined intensity, and the reflection control surface 53 is irradiated with the light L, in the same manner as in the first embodiment. In the present embodiment, the region irradiated with the light L on the reflection control surface 53 is a partial region of the reflection control surface 53. Furthermore, the control unit 70 controls the plate moving device 90 so that the position of the light source 41 in the vertical direction with respect to the reflection device 50 becomes in a predetermined first position. In the present embodiment, the first position is set such that a region irradiated with the light L on the reflection control surface 53 becomes a lower region on the reflection control surface 53, and the region irradiated with the light L includes an intersection of the optical axis of the projection lens 60 and the reflection control surface 53. In addition, the control unit 70 controls the reflection device 50 so that the high beam light distribution pattern PH is formed by the light LF emitted in the first direction from the region of the reflection control surface 53 irradiated with the light L. That is, the control unit 70 controls the tilt state of the reflective element 54 located in the region irradiated with the light L, and causes the reflection device 50 to emit the light LF forming the high beam light distribution pattern PH. A region of the reflection control surface 53 from which the light LF forming the high beam light distribution pattern PH is emitted includes an intersection of the optical axis of the projection lens 60 and the reflection control surface 53. Note that most of the light LS emitted from the reflection control surface 53 toward the second direction is incident on the light absorbing plate 65 and converted into heat as in the first embodiment.

In this manner, the light L emitted from the light source 41 is applied to the lower region of the reflection control surface 53, and the light LF emitted from this region passes through the projection lens 60 and is emitted from the lamp unit 20, and is emitted from the vehicular lamp 1 via the front cover 12. In the present embodiment, as in the first embodiment, because the light distribution pattern formed by the light LF emitted from the reflection control surface 53 toward the first direction is the high beam light distribution pattern PH, light having the high beam light distribution pattern PH is emitted from the vehicular lamp 1.

In this manner, when the selection of the high beam in the light switch 74 is switched to the image drawing in a state where the light having the high beam light distribution pattern PH is emitted from the vehicular lamp 1, the control unit 70 controls the plate moving device 90 to move the base plate 31. Specifically, the control unit 70 controls the plate moving device 90 so that the position of the light source 41 in the vertical direction with respect to the reflection device 50 is in a predetermined second position that is a position above the first position. Therefore, the region irradiated with the light L on the reflection control surface 53 moves upward. The region irradiated with the light L in this case is an upper region of the reflection control surface 53, and does not include the intersection of the optical axis of the projection lens 60 and the reflection control surface 53. That is, the control unit 70 controls the plate moving device 90 to move the base plate 31 so that the region irradiated with the light L comes in such a region. The region irradiated with the light L in the case where the light source 41 is in the first position and the region irradiated with the light L in the case where the light source 41 is in the second position may or may not overlap each other. In addition, the region irradiated with the light L in the case where the light source 41 is in the second position may include the intersection of the optical axis of the projection lens 60 and the reflection control surface 53. Furthermore, the control unit 70 controls the reflection device 50 so that the light distribution pattern forming a predetermined image is formed by the light LF emitted in the first direction from the region of the reflection control surface 53 irradiated with the light L. That is, the control unit 70 controls the tilt state of the reflective element 54 located in the region irradiated with the light L emitted from the light source 41 in the second position, and causes the reflection device 50 to emit the light LF forming the light distribution pattern constituting the predetermined image. In the present embodiment, the region where the light LF forming the light distribution pattern constituting a predetermined image is emitted on the reflection control surface 53 does not overlap with the region where the light LF forming the high beam light distribution pattern PH is emitted. However, a part of the region where the light LF forming the light distribution pattern constituting the image is emitted and a part of the region where the light LF forming the high beam light distribution pattern PH is emitted may overlap each other.

Figure 9:
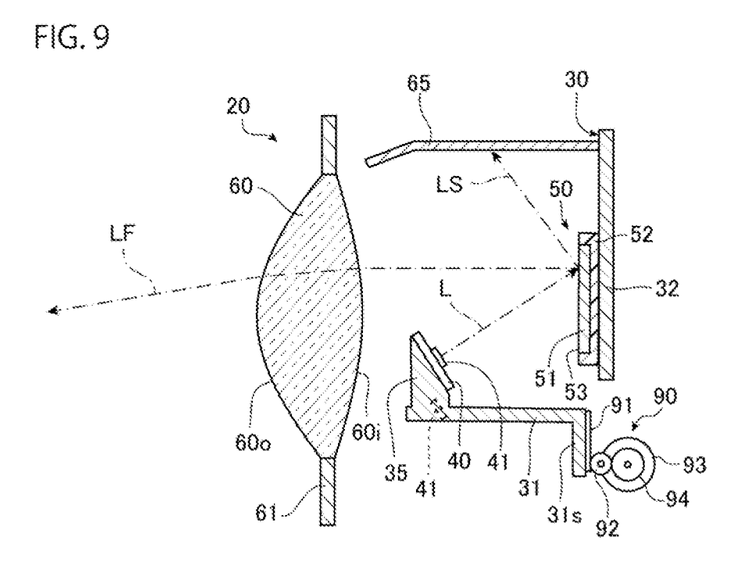
FIG. 9 is a view showing one example of a state of a lamp unit when a light source moves.

In this manner, the region irradiated with the light L on the reflection control surface 53 moves from the position in the case of emitting the light LF forming the high beam light distribution pattern PH. Then, the light LF forming the light distribution pattern constituting the predetermined image is emitted from a region at least partially different from the region on the reflection control surface 53 where the light LF forming the high beam light distribution pattern PH is emitted. That is, it can be understood that the reflection device 50 changes the emission position of the light LF forming the light distribution pattern according to the change in the light distribution pattern of the light LF to be emitted. In this manner, the incident position of the light LF on the incident surface 60*i* of the projection lens 60 changes as the emission position of the light LF forming the light distribution pattern in the reflection device 50 changes. Therefore, the emission position of the light LF emitted from the emission surface 60*o* of the projection lens 60 changes, and the emission direction of the light LF changes from the emission surface 60*o*. Here, FIG. 9 is a view showing one example of a state of the lamp unit 20 when the light source 41 has moved, and the light source 41 located at the first position is indicated by broken lines in FIG. 9. In FIG. 9, description of the housing 10 is omitted for easy understanding. In the present embodiment, the shapes of the incident surface 60*i* and the emission surface 60*o* of the projection lens 60 are adjusted such that the emission direction of the light LF from the projection lens 60 in a case where the position of the light source 41 with respect to the reflection device 50 is in the second position is downward with respect to the emission direction of the light LF from the projection lens 60 in a case where the position of the light source 41 with respect to the reflection device 50 is in the first position. Therefore, the emission direction of the light LF to be emitted from the lamp unit 20 becomes a downward direction as compared with the case where the light LF is light forming the high beam light distribution pattern. Therefore, it can be understood that the lamp unit 20 of the present embodiment adjusts the emission direction of the light LF to be emitted from the lamp unit 20 according to the change in the light distribution pattern of the light LF to be emitted from the reflection device 50 serving as the light distribution pattern formation unit, in the same manner as in the lamp unit 20 of the first embodiment. As described above, because the light distribution pattern formed by the light LF emitted from the reflection control surface 53 toward the first direction is the light distribution pattern constituting a predetermined image, light having the light distribution pattern constituting the predetermined image is emitted from the vehicular lamp 1, and the predetermined image is drawn on the road surface or the like in front of the vehicle. The control unit 70 controls the light source 41 so that the light source 41 keeps emitting the white light L having a predetermined intensity. In addition, the storage unit 75 stores information for the control unit 70 to control the plate moving device 90 as described above, and the control unit 70 outputs a control signal to the driving circuit electrically connected to the plate moving device 90 based on this information. The driving circuit adjusts the rotation of the motor 93 of the plate moving device 90 based on the control signal from the control unit 70. In this manner, the control unit 70 controls the plate moving device 90.

As described above, in the same manner as in the vehicular lamp 1 of the first embodiment, the vehicular lamp 1 of the present embodiment can change the emission direction of the light LF while changing the light distribution pattern of the light LF to be emitted with a simple structure as compared with the case of including a plurality of lamp units that emit light having different light distribution patterns.

In the vehicular lamp 1 of the present embodiment, as described above, the reflection device 50 serving as the light distribution pattern formation unit changes the emission position of the light LF forming the light distribution pattern according to the change in the light distribution pattern of the light LF to be emitted. Therefore, the emission position of the light LF to be emitted from the reflection device 50 in the projection lens 60 changes, and the emission direction of the light LF to be emitted from the projection lens 60 changes. Therefore, the vehicular lamp 1 of the present embodiment can adjust the emission direction of the light LF to be emitted from the lamp unit 20 by controlling the emission position of the light LF forming the light distribution pattern in the reflection device 50. In addition, the vehicular lamp 1 of the present embodiment can suppress an increase in size of the vehicular lamp as compared with the case of adjusting the emission direction of the light LF to be emitted from the lamp unit 20 by the movement of the member included in the lamp unit 20.

In the present embodiment, the region of the reflection control surface 53 irradiated with the light L emitted from the light source 41 is a partial region of the reflection control surface 53. Then, the light source 41 is moved according to the change in the light distribution pattern of the light LF to be emitted from the reflection device 50, and the region irradiated with the light L on the reflection control surface 53 is moved. However, the emission position of the light LF forming the light distribution pattern may be changed according to the change in the light distribution pattern of the light LF to be emitted from the reflection device 50. For example, when almost the entire surface of the reflection control surface 53 is irradiated with the light L emitted from the light source 41, the light source 41 may not be moved according to the change in the light distribution pattern of the light LF to be emitted from the reflection device 50. From the viewpoint of reducing the amount of the light LS converted into heat by the light absorbing plate 65, it is preferable to move the light source 41 according to the change in the light distribution pattern of the light LF to be emitted from the reflection device 50 as described above.

The present invention has been described by taking the above-described embodiments as examples. However, the present invention is not limited to these embodiments.

For example, in the above embodiments, the vehicular lamp 1 can emit a high beam and draw a mark similar to a parking prohibition sign. However, the light to be emitted from the vehicular lamp 1 is not particularly limited. For example, the vehicular lamp 1 may be capable of emitting a low beam and drawing a mark similar to a parking prohibition sign, and the image to be drawn may be another mark, a character, or an image including a mark and a character.

In addition, the vehicular lamp 1 may further include another lamp unit, and the light distribution pattern may be formed by the light emitted from the plurality of lamp units. In this case, the lamp unit 20 emits light forming a part of the light distribution pattern of the light emitted from the vehicular lamp 1, and for example, the lamp unit 20 may emit light forming a part of the high beam light distribution pattern PH.

In the above embodiments, the lamp unit 20 adjusts the emission direction of the light LF to be emitted from the lamp unit 20 in the vertical direction according to the change in the light distribution pattern of the light LF to be emitted from the reflection device 50 serving as the light distribution pattern formation unit. However, the lamp unit 20 only needs to adjust the emission direction of the light LF to be emitted from the lamp unit 20 according to the change in the light distribution pattern of the light LF to be emitted from the reflection device 50, and the lamp unit 20 may adjust the emission direction of the light LF to be emitted from the lamp unit 20 in the left-right direction. In this case, for example, the light distribution pattern of the light LF to be emitted from the reflection device 50 may be changed from, for example, the high beam light distribution pattern PH to a light distribution pattern in which the high beam light distribution pattern PH is expanded to a side where the emission direction of the light LF is changed. By changing the light distribution pattern of the light LF to be emitted from the reflection device 50 in this manner, the vehicular lamp can irradiate the traveling direction with light in a curved path, and visibility in the curved path can improve.

In the above embodiments, the lamp unit 20 includes the projection lens 60. However, the lamp unit 20 may not include the projection lens 60.

In the above embodiments, the lamp unit 20 includes the projection lens 60 having one lens. However, the projection lens 60 may be a lens group having a plurality of lenses arranged in parallel in the transmission direction of the light emitted from the reflection device 50 serving as the light distribution pattern formation unit.

In the above embodiments, the light distribution pattern formation unit is the reflection device 50 that includes the reflection control surface 53 formed from the reflective surfaces 54r of the plurality of reflective elements 54 capable of individually switching the tilt state, in which the reflection control surface 53 is irradiated with the light L emitted from the light source 41, and the reflection device 50 reflects the light L emitted from the light source 41 by the reflection control surface 53 to form the light distribution pattern corresponding to the tilt state of the plurality of reflective elements 54. However, the light distribution pattern formation unit only needs to be irradiated with light L emitted from the light source 41 and emit light and further be able to change the light distribution pattern of the light to be emitted. For example, the light distribution pattern formation unit may be a phase modulation element that diffracts light to be emitted from the light source with a changeable phase modulation pattern and emits light having a light distribution pattern based on the phase modulation pattern, or may be a liquid crystal display or the like. Examples of the phase modulation element include a liquid crystal on silicon (LCOS) which is a reflective liquid crystal panel, a liquid crystal display (LCD) which is a transmissive liquid crystal panel, and a grating light valve (GLV) in which a plurality of reflectors are formed on a silicon substrate.

An LCOS includes a silicon substrate in which a plurality of electrodes whose potentials are independently controlled are arranged in a matrix on a surface, a transparent electrode, and a liquid crystal layer sandwiched between the electrodes and the transparent electrode. In the LCOS, the potentials of the plurality of electrodes are independently controlled, and therefore the refractive index of the liquid crystal layer sandwiched between a corresponding electrode in the electrodes and the transparent electrode changes independently. As a result, light incident from the transparent electrode side, reflected by the electrode, and emitted from the transparent electrode side passes through the liquid crystal layer having a refractive index corresponding to the potential of the electrode. Therefore, the phase of the light incident on the LCOS is adjusted for each portion corresponding to each electrode, and the light with the modulated phase distribution is emitted from the LCOS. Because light beams having phases different from each other interfere with each other and are diffracted, the LCOS diffracts incident light according to a pattern formed from the refractive index of the liquid crystal layer corresponding to each electrode, and emits light having a light distribution pattern based on the pattern of the refractive index. Because the pattern of the refractive index is a pattern according to the potential in each electrode, the pattern of the refractive index and the pattern of the potential in each electrode can be understood as phase modulation patterns. In an LCD, similarly to an LCOS which is a reflective liquid crystal panel, a phase of light incident on the LCD is adjusted for each portion corresponding to each electrode. Therefore, a pattern formed from the refractive index of the liquid crystal layer corresponding to each electrode and a pattern of the potential at each electrode are phase modulation patterns, and the LCD diffracts incident light and emits light of a light distribution pattern based on the phase modulation pattern. In the LCD, each electrode is a transparent electrode. A GLV is a reflection type phase modulation element, and adjusts a phase of light incident on the GLV for each portion corresponding to each reflector by electrically controlling deflection of each reflector. Therefore, the pattern formed from the deflection amount of each reflector and the pattern of the voltage applied to each reflector are phase modulation patterns, and the GLV diffracts incident light and emits light of a light distribution pattern based on the phase modulation pattern. These LCOS and GLV can be arranged, for example, at the same position as the reflection device 50 in the above embodiment.

In the above embodiment, the light source 41 is a surface mount LED. However, the light source is not particularly limited, and for example, the light source may be a laser element that emits laser light. Furthermore, the number of the light source 41 and the color of light emitted from the light source 41 are not particularly limited.

According to the present invention, there is provided a vehicular lamp capable of changing an emission direction of light to be emitted while changing a light distribution pattern of the light with a simple structure, and the vehicular lamp can be used in the field of vehicular lamps for automobiles and the like.

The invention claimed is:

1. A vehicular lamp comprising a lamp unit, the lamp unit including:
   a light source; and
   a light distribution pattern formation unit that is irradiated with light emitted from the light source and emits light and is further capable of changing a light distribution pattern of the light to be emitted,
   wherein the lamp unit adjusts an emission direction of the light to be emitted from the lamp unit according to a change in the light distribution pattern of the light to be emitted from the light distribution pattern formation unit;
   wherein the lamp unit further includes a support member that supports the light source and the light distribution pattern formation unit and tilts according to the change in the light distribution pattern of light to be emitted from the light distribution pattern formation unit.

2. The vehicular lamp according to claim 1, wherein the light distribution pattern formation unit is a reflection device including a reflection control surface formed from reflective surfaces of a plurality of reflective elements capable of individually switching a tilt state, in which the reflection control surface is irradiated with light emitted from the light source, and the reflection device reflects the light emitted from the light source with the reflection control surface to form a light distribution pattern corresponding to the tilt state of the plurality of reflective elements.

3. The vehicular lamp according to claim 1,
   wherein the light distribution pattern formation unit is a phase modulation element that diffracts the light emitted from the light source with a changeable phase modulation pattern and emits light having a light distribution pattern based on the phase modulation pattern.

* * * * *